United States Patent
Delferro et al.

(10) Patent No.: US 11,596,935 B2
(45) Date of Patent: Mar. 7, 2023

(54) CATALYTIC POLYMER PROCESSING

(71) Applicant: UCHICAGO ARGONNE, LLC, Chicago, IL (US)

(72) Inventors: Massimiliano Delferro, Chicago, IL (US); Magali S. Ferrandon, Steger, IL (US); Kenneth R. Poeppelmeier, Evanston, IL (US); Aaron D. Sadow, Ames, IA (US); Susannah Scott, Goleta, CA (US); Anne M. LaPointe, Lemont, IL (US); Geoffrey Coates, Lemont, IL (US)

(73) Assignee: UChicago Argonne, LLC, Chicago, IL (US)

( * ) Notice: Subject to any disclaimer, the term of this patent is extended or adjusted under 35 U.S.C. 154(b) by 72 days.

(21) Appl. No.: 16/749,885

(22) Filed: Jan. 22, 2020

(65) Prior Publication Data

US 2020/0238269 A1    Jul. 30, 2020

Related U.S. Application Data

(60) Provisional application No. 62/796,482, filed on Jan. 24, 2019.

(51) Int. Cl.
| | |
|---|---|
| *C08F 8/50* | (2006.01) |
| *B01J 35/00* | (2006.01) |
| *B01J 23/00* | (2006.01) |
| *B01J 23/42* | (2006.01) |
| *C08F 10/02* | (2006.01) |
| *B01J 35/02* | (2006.01) |

(52) U.S. Cl.
CPC .......... *B01J 35/0013* (2013.01); *B01J 23/42* (2013.01); *B01J 35/023* (2013.01); *C08F 8/50* (2013.01); *C08F 10/02* (2013.01)

(58) Field of Classification Search
CPC .......... C08F 8/50; B01J 35/023; B01J 23/002
See application file for complete search history.

(56) References Cited

U.S. PATENT DOCUMENTS

| | | |
|---|---|---|
| 2005/0285421 A1 | 12/2005 | Novakovich et al. |
| 2007/0249497 A1 | 10/2007 | Tanaka et al. |
| 2011/0172088 A1 | 7/2011 | Bedard et al. |
| 2012/0310023 A1 | 12/2012 | Huang et al. |
| 2014/0178262 A1 | 6/2014 | Tran et al. |
| 2015/0361374 A1 | 12/2015 | Kumar et al. |
| 2016/0369174 A1 | 12/2016 | Kool et al. |
| 2019/0169504 A1 | 6/2019 | Gu et al. |

(Continued)

FOREIGN PATENT DOCUMENTS

| | | |
|---|---|---|
| JP | 2003-321682 A | 11/2003 |
| JP | 4154929 B2 | 9/2008 |
| JP | 5111246 B2 | 1/2013 |

(Continued)

OTHER PUBLICATIONS

U.S. Appl. No. 62/796,482, filed Jan. 24, 2019, Delferro.

(Continued)

*Primary Examiner* — Catherine S Branch
(74) *Attorney, Agent, or Firm* — Foley & Lardner LLP

(57) ABSTRACT

A method of upcycling polymers to useful hydrocarbon materials. A catalyst with nanoparticles on a substrate selectively docks and cleaves longer hydrocarbon chains over shorter hydrocarbon chains. The catalyst includes metal nanoparticles in an order array on a substrate.

7 Claims, 2 Drawing Sheets

(56) References Cited

U.S. PATENT DOCUMENTS

| | | | |
|---|---|---|---|
| 2020/0238269 | A1 | 7/2020 | Delferro et al. |
| 2021/0061971 | A1 | 3/2021 | Delferro et al. |

FOREIGN PATENT DOCUMENTS

| | | |
|---|---|---|
| WO | WO-2007/126120 A1 | 11/2007 |
| WO | WO-2007/126123 A1 | 11/2007 |
| WO | WO-2021/041323 A1 | 3/2021 |

OTHER PUBLICATIONS

"Advancing Sustainable Materials Management: 2014 Fact Sheet," United States Environmental Protection Agency, EPA530-R-17-01, 22 pages (2016).

Almithn & Hibbitts, "Comparing Rate and Mechanism of Ethane Hydrogenolysis on Transition-Metal Catalysts," The Journal of Physical Chemistry C 123(9), pp. 5421-5432 (2019).

Almithn & Hibbitts, "Effects of Catalyst Model and High Adsorbate Coverages in ab Initio Studies of Alkane Hydrogenolysis," ACS Catalysis 8(7), pp. 6375-6387 (2018).

Andersen, et al., "Pauling's rules for oxide surfaces," Surface Science Reports 73(5), pp. 213-232 (2018).

Beyene, "Recycling of plastic waste into fuels, a review," International Journal of Science, Technology and Society 2(6), pp. 190-195 (2014).

Burange, et al., "Heterogeneously catalyzed strategies for the deconstruction of high density polyethylene: plastic waste valorisation to fuels," Green Chemistry 17(1), pp. 146-156 (2015).

Carr, et al., "Relationship between self-seeded and epitaxial crystallization from polymer solutions: A potentially new method for molecular weight separation and a new decoration method for alkali halides," Journal of Polymer Science: Polymer Physics 8(9), pp. 1467-1490 (1970).

Celik, et al., "Upcycling Single-Use Polyethylene into High-Quality Liquid Products," ACS Central Science 5(11), pp. 1795-1803 (2019).

Chesters, et al., "The reflection-absorption infrared spectra of n-alkanes adsorbed on Pt(111)," Surface Science 209(1-2), pp. 89-99 (1989).

Christensen, et al., "Controlled Growth of Platinum Nanoparticles on Strontium Titanate Nanocubes by Atomic Layer Deposition," Small 5(6), pp. 750-757 (2009).

Crosby, et al., "All Roads Lead to TiO2: TiO2-Rich Surfaces of Barium and Strontium Titanate Prepared by Hydrothermal Synthesis," Chemistry of Materials 30(3), pp. 841-846 (2018).

Crosby, et al., "Wulff shape of strontium titanate nanocuboids," Surface Science 632, pp. L22-L25 (2015).

Dendooven, et al., "Independent tuning of size and coverage of supported Pt nanoparticles using atomic layer deposition," Nature Communications 8, 1074, 12 pages (2017).

Enterkin, et al., "Epitaxial Stabilization of Face Selective Catalysts," Topics in Catalysis 56(18-20), pp. 1829-1834 (2013).

Enterkin, et al., "Oriented Catalytic Platinum Nanoparticles on High Surface Area Strontium Titanate Nanocuboids," Nano Letters 11(3), pp. 993-997 (2011).

Enterkin, et al., "Propane Oxidation over Pt/SrTiO3 Nanocuboids," ACS Catalysis 1(6), pp. 629-635 (2011).

Erdemir, et al., "Carbon-based tribofilms from lubricating oils," Nature 536, pp. 67-71 (2016).

Erdman, et al., "Surface Structures of SrTiO3 (001): A TiO2-rich Reconstruction with a c(4×2) Unit Cell," Journal of the American Chemical Society 125(22), pp. 10050-10056 (2003).

Flaherty & Iglesia, "Transition-State Enthalpy and Entropy Effects on Reactivity and Selectivity in Hydrogenolysis of n-Alkanes," Journal of the American Chemical Society 135(49), pp. 18586-18599 (2013).

Flaherty, et al., "Catalytic Ring Opening of Cycloalkanes on Ir Clusters: Alkyl Substitution Effects on the Structure and Stability of C—C Bond Cleavage Transition States," The Journal of Physical Chemistry C 119(5), pp. 2597-2613 (2015).

Flaherty, et al., "Metal-Catalyzed C—C Bond Cleavage in Alkanes: Effects of Methyl Substitution on Transition-State Structures and Stability," Journal of the American Chemical Society 136(27), pp. 9664-9676 (2014).

Flaherty, et al., "Theoretical and kinetic assessment of the mechanism of ethane hydrogenolysis on metal surfaces saturated with chemisorbed hydrogen," Journal of Catalysis 311, pp. 350-356 (2014).

Grillo, et al., "From Single Atoms to Nanoparticles: Autocatalysis and Metal Aggregation in Atomic Layer Deposition of Pt on TiO2 Nanopowder," Small 14(23), 1800765, 11 pages (2018).

Hahladakis, et al., "An overview of chemical additives present in plastics: Migration, release, fate and environmental impact during their use, disposal and recycling," Journal of Hazardous Materials 344, pp. 179-199 (2018).

Hazrat, et al., "Utilization of Polymer Wastes as Transport Fuel Resources—a Recent Development," Energy Procedia 61, pp. 1681-1685 (2014).

Hibbitts, et al., "Effects of Chain Length on the Mechanism and Rates of Metal-Catalyzed Hydrogenolysis of n-Alkanes," The Journal of Physical Chemistry C 120(15), pp. 8125-8138 (2016).

Hopewell, et al., "Plastics recycling: challenges and opportunities," Philosophical Transactions of the Royal Society B: Biological Sciences 364(1526), pp. 2115-2126 (2009).

Jia, et al., "Efficient and selective degradation of polyethylenes into liquid fuels and waxes under mild conditions," Science Advances 2(6), e1501591, 7 pages (2016).

Kennedy, et al., "Replication of SMSI via ALD: TiO2 Overcoats Increase Pt-Catalyzed Acrolein Hydrogenation Selectivity," Catalysis Letters 148(8), pp. 2223-2232 (2018).

Kienzle & Marks, "Surface transmission electron diffraction for SrTiO3 surfaces," CrystEngComm 14(23), pp. 7833-7839 (2012).

Kresse & Furthmuller, "Efficient iterative schemes for ab initio total-energy calculations using a plane-wave basis set," Physical Review B 54(16), pp. 11169-11186 (1996).

Kresse & Hafner, "Ab initio molecular dynamics for liquid metals," Physical Review B 47(1), pp. 558-561 (1993).

Kresse & Hafner, "Ab initio molecular-dynamics simulation of the liquid-metal-amorphous-semiconductor transition in germanium," Physical Review B 49(20), pp. 14251-14269 (1994).

Kurosu, et al., "Structural characterization of 13C-labeled n-tetracosane adsorbed on the surface of silica gel by high-resolution solid-state 13C NMR spectroscopy," Journal of Molecular Structure 516(2-3), pp. 177-184 (2000).

Lin, et al., "Synthesis-Dependent Atomic Surface Structures of Oxide Nanoparticles," Physical Review Letters 111(15), 156101, 5 pages (2013).

Manner, et al., "Melting of Rodlike Molecules on Pt(111). Infrared Spectroscopic Studies of Isotopically Labeled n-Alkanes," The Journal of Physical Chemistry B 102(44), pp. 8816-8824 (1998).

Marks & Peng, "Nanoparticle shape, thermodynamics and kinetics," Journal of Physics: Condensed Matter 28(5), 053001, 48 pages (2016).

Mastral, et al., "Catalytic degradation of high density polyethylene over nanocrystalline HZSM-5 zeolite," Polymer Degradation and Stability 91(12), pp. 3330-3338 (2006).

Oya, et al., "Catalytic Production of Branched Small Alkanes from Biohydrocarbons," ChemSusChem 8(15), pp. 2472-2475 (2015).

Rabuffetti, et al., "Synthesis-Dependent First-Order Raman Scattering in SrTiO3 Nanocubes at Room Temperature," Chemistry of Materials 20(17), pp. 5628-5635 (2008).

Rahimi & Garcia, "Chemical recycling of waste plastics for new materials production," Nature Reviews Chemistry 1, 0046, 11 pages (2017).

Wong, et al., "Catalytic Cracking of LDPE Dissolved in Benzene Using Nickel-Impregnated Zeolites," Industrial & Engineering Chemistry Research 55(9), pp. 2543-2555 (2016).

Wu, et al., "Formation and Nature of Carbon-Containing Tribofilms," ACS Applied Materials & Interfaces 11(17), pp. 16139-16146 (2019).

(56) References Cited

OTHER PUBLICATIONS

Zhuo & Levendis, "Upcycling waste plastics into carbon nanomaterials: A review," Journal of Applied Polymer Science 131(4), 39931, 14 pages (2014).

Kanbur, et al., "Catalytic carbon-carbon bond cleavage and carbon-element bond formation give new life for polyolefins as biodegradable surfactants," Chem 7(5), pp. 1347-1362 (2021).

Tennakoon, et al., "Catalytic upcycling of high-density polyethylene via a processive mechanism," Nature Catalysis 3, pp. 893-901 (2020).

Zhang, et al., "Polyethylene upcycling to long-chain alkylaromatics by tandem hydrogenolysis/aromatization," Science 370(6515), pp. 437-441 (2020).

Che & Bennett, "The Influence of Particle Size on the Catalytic Properties of Supported Metals," Advances in Catalysis 36, pp. 55-172 (1989).

Deak, "Strontium titanate surfaces," Materials Science and Technology 23(2), pp. 127-136 (2007).

Defaud & Basset, "Catalytic Hydrogenolysis at Low Temperature and Pressure of Polyethylene and Polypropylene to Diesels or Lower Alkanes by a Zirconium Hydride Supported on Silica-Alumina: A Step Toward Polyolefin Degradation by the Microscopic Reverse of Ziegler-Natta Polymerization," Angewandte Chemie 37(6), pp. 806-810 (1998).

Engelhardt, et al., "Structure Sensitivity of Acrolein Hydrogenation by Platinum Nanoparticles on $Ba_xSr_{1-x}TiO_3$ Nanocuboids," ChemCatChem 10(3), pp. 632-641 (2018).

Goodenough, "Electronic and ionic transport properties and other physical aspects of perovskites," Reports on Progress in Physics 67(11), pp. 1915-1993 (2004).

Hsieh, et al., "Shape-Tunable $SrTiO_3$ Crystals Revealing Facet-Dependent Optical and Photocatalytic Properties," The Journal of Physical Chemistry C 123(22), pp. 13664-13671 (2019).

Inoue, et al., "Structural and dynamical studies of 13C-labeled polyethylene adsorbed on the surface of silica gel by high-resolution solid-state 13C NMR spectroscopy," Acta Polymerica 46, pp. 420-423 (1995).

International Search Report & Written Opinion for PCT/US2020/047654 dated Nov. 20, 2020, 9 pages.

Jena, et al., "Studies on the ionic transport and structural investigations of $La_{0.5}Li_{0.5}TiO_3$ perovskite synthesized by wet chemical methods and the effect of Ce, Zr substitution at Ti site," Journal of Materials Science 40, pp. 4737-4748 (2005).

Kienzle, et al., "Vacant-site octahedral tilings on $SrTiO_3$ (001), the ([sqrt]13 x [sqrt]13)R33.7 surface, and related structures," Physical Review Letters 106(17), 176102, 4 pages (2011).

Kresse & Furthmuller, "Efficiency of ab-initio total energy calculations for metals and semiconductors using a plane-wave basis set," Computational Materials Science 6(1), pp. 15-50 (1996).

Nakaji, et al., "Regioselective hydrogenolysis of alga-derived squalane over silica-supported ruthenium-vanadium catalyst," Fuel Processing Technology 176, pp. 249-257 (2018).

Yang & Somorjai, "Adsorption and Reactions of C6 Hydrocarbons at High Pressures on Pt(111) Single-Crystal Surfaces Studied by Sum Frequency Generation Vibrational Spectroscopy: Mechanisms of Isomerization and Dehydrocyclization of n-Hexane," Journal of the American Chemical Society 126(24), pp. 7698-7708 (2004).

Zhang, et al., "Adhesion of Pt Nanoparticles Supported on $\gamma$-$Al_2O_3$ Single Crystal," The Journal of Physical Chemistry C 117(41), pp. 21407-21412 (2013).

Quareshi, et al., "Catalytic consequences of ultrafine Pt clusters supported on $SrTiO_3$ for photocatalytic overall water splitting," Journal of Catalysis 376, pp. 180-190 (2019).

CATALYTIC POLYMER PROCESSING

CROSS REFERENCE TO RELATED APPLICATIONS

The present application is a non-provisional application which claims priority to U.S. Provisional Patent Application No. 62/796,482 filed Jan. 24, 2019, the contents of all of which are incorporated herein by reference in their entireties.

STATEMENT OF GOVERNMENT SPONSORSHIP

This invention was made with government support under Contract No. DE-AC02-06CH11357 awarded by the United States Department of Energy to UChicago Argonne, LLC, operator of Argonne National Laboratory, and under Contract No. DE-AC02-07CH11358 awarded by the United States Department of Energy to Iowa State University of Science and Technology, operator of Ames Laboratory. The government has certain rights in the invention.

TECHNICAL FIELD

The present disclosure relates generally to a hydrocatalytic process that selectively converts plastics into other hydrocarbon products.

BACKGROUND

Synthetic polymers have quickly become engrained in everyday use. In particular, those polymers—commonly referred to as plastics—have become a ubiquitous part of modern consumer culture, consuming a large amount of global resources and generating a large amount of waste materials. The three hundred million tons of plastics that are created and discarded annually consume 6.8% of the crude oil and natural gas produced worldwide. In the United States alone, thirty million tons of polymers are produced each year; 75% of these materials are discarded to landfill after a single use.

In light of both the large drain on global resources and the massive amount of waste material generated, plastics represent a tremendous and as-yet-untapped domestic resource for the production of chemicals and new materials. Efficient technologies for extracting this value from discarded polymers would be equivalent to recovering about 3.5 billion barrels of oil ($175 billion at $50/barrel) each year and could create entirely new industries. Currently, most of the stored energy in plastics is irreversibly lost into landfills that are overflowing throughout our planet. While physical recycling is desirable and wide-spread in many areas for a wide range of materials, it is most effective for recovering glass, paper, and metals such as aluminum. Recycling, to-date, has not been able to efficiently and cleanly recoup the inherent value in plastics, especially low density polyethylene (plastic bags), polypropylene, and polystyrene. As a result, many plastics are just burned as fuel or inefficiently reprocessed to manufacture lower-value materials (known as downcycling). Plastics are expensive, highly engineered materials that are wasted as boiler fuel. Existing deconstruction approaches can convert the macromolecules into smaller fragments, but the result is an extremely broad distribution of lighter hydrocarbons whose low value makes them much less useful than virgin fossil fuels and petrochemicals.

Prior work has developed processes to utilize waste plastic as a feed stock. For example, current polymer conversion processes utilize catalytic hydrocracking or pyrolysis with zeolites, or gasification (Beyene, 2014; Hazrat et al., 2014). These processes which occur at high temperature, above 500° C., lead to a broad distribution of fuel-type hydrocarbons (Zhuo et al., 2014; Beyene, 2014; WO2007126123A1; JP2003321682A). However, these current processes include several limiting or undesirable steps. For example, the plastic or polymer has to be dissolved in solvent at high temperature, such as 150° C. (WO2007126123A1; JP2003321682A; JP4154929B2; JP5111246B2), and washed, and impurities have to be extracted to remove chlorine compounds that are detrimental to catalysts (WO2007126120A1). The addition of solvent or water to the process is not only costly but it also decreases the overall yield (Beyene, 2014). Additional reactions after hydrogenolysis have been reported, including cyclization for increasing the BTX fraction (JP2003321682) and separations of the products (JP41549229B2; JP41549229B2; JP5111246B2). Conditions for hydrogenolysis are harsher, with temperatures ranging from 300° C. to 500° C., and pressure ranging from 145 to 2950 psi (WO2007126123A1; JP2003321682A).

Thus, there remains a need for a process for recycling plastics into useful materials, in particular for upcycling plastics into heavier hydrocarbon materials, such as wax lubricants rather than down cycling to lower-value light hydrocarbons.

SUMMARY

Embodiments described herein relate generally to a method of processing a polymer. The method includes exposing the polymer to catalyst at a temperature of 100° C. to 500° C., docking the polymer to the catalyst comprising an ordered array of nanoparticles on a crystalline substrate, docking the polymer at a first nanoparticle within the ordered array of nanoparticles, and cleaving at least one carbon-carbon bond of the plastic at a second nanoparticle within the ordered array of nanoparticles. A plurality of hydrocarbon fragments are formed from the cleaving, with the hydrocarbon fragments each having a carbon backbone shorter than an interparticle distance between the first nanoparticle and the second nanoparticle. The polymer has a carbon backbone length of at least the interparticle distance.

In some embodiments, a catalyst comprising a plurality of metal nanoparticles, a perovskite substrate, and the plurality of ordered metal nanoparticles deposited on the perovskite substrate in an ordered array corresponding to a crystal structure of the perovskite substrate with a particle-to-particle spacing of 1 nm to 30 nm.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Figure 1:
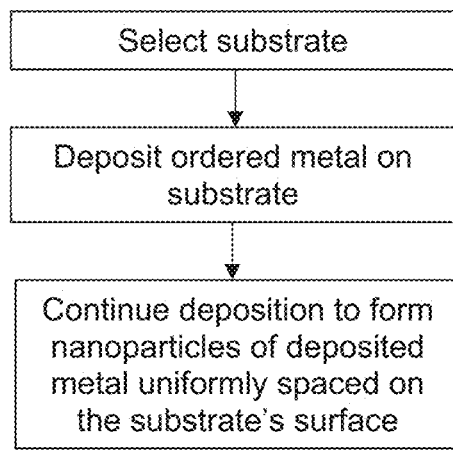
FIG. 1 is a flow chart depicting one method of manufacturing a catalyst having ordered metal nanoparticles supported on a substrate surface.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Multifunctional catalysts must be able to (i) induce docking of a polymer chain at a specific location, (ii) control the configuration of the adsorbed chain on the surface of the catalyst, and (iii) cleave a certain bond at a precise position along the chain to deconstruct hydrocarbon polymers efficiently into fragments of relatively uniform size. Described herein are alternative processes for polymer conversion with multifunctional catalysts that selectively convert polymers (plastics) into more valuable, narrowly distributed products, such as lubricants, waxes, and the like. These processes lead to a broad distribution of hydrocarbons, including those known to be useful for industrial or commercial purposes.

Specifically, ordered metal nanoparticles (e.g., platinum) supported on the surface of crystal material such as perovskites (e.g., strontium titanate) are effective catalysts for reducing polymers to smaller fragments. These smaller fragments refer to fragments having a size, typically expressed in terms of carbon backbone length of the fragment, selected based on the chose parameters of the catalytic material, most notably an interparticle spacing as noted below. The metal nanoparticle catalysts promote carbon-carbon bond cleaving in presence of hydrogen (hydrogenolysis) through a "chopping" approach wherein the polymer is docked and cleaved.

As described further below, catalytic materials provide for spatial arrangement of docking and cleaving sites to emulate enzymatic cooperativity, providing for a controllable synthetic mechanism for cleaving polymers. As used herein, "docking" and "chopping"/"cleaving" are defined as a form of catalytic cooperativity in that concerted, distance-dependent actions (FIG. 3) facilitate the described polymer breakdown. Catalysts that identify and cleave specific bonds at precise positions along a macromolecular chain (polymer, plastic) will be able to convert hydrocarbon polymers efficiently into relatively uniform fragments.

The support material is comprised of crystalline nanocuboids and is a single phase material that is non-reactive with the desired hydrocarbons to be processed. For example, the support material may be a perovskite, for example a perovskite selected from the group consisting of strontium, barium, and calcium titanate or other perovskites with general formula $ABO_3$, or those that are oxygen-deficient, $ABO_{3-x}$ where x is in the range $0 \leq x \leq 0.5$. The morphology of the nanocuboid phase, which is the support for the metal nanoparticles, such as platinum, adopts and mirrors the cubic crystal structure of the perovskite which ranges from a=3.5-4.2 Å and is on average a cube of about a=4.0 Å. This unit cell contains one A-cation, one B-cation, and three oxygen anions ($ABO_3$). A typical nanocuboid of $SrTiO_3$ is terminated with the $TiO_2$ atomic layer exposed, although SrO is also possible. For example, these $TiO_2$ layers terminate all six surfaces of the nanocuboids. The nanocuboids that are crystallized from the solution can vary in size, however cubes 30-60 nm (300-600 Å) are used to maintain specific surface area. For example, a typical 40 nm (400 Å) nanocuboid, that is a small cube 40 nm×40 nm on a side has six surfaces, each 1600 nm$^2$ in area, on which the many platinum nanoparticles nucleate with the interparticle spacing depending on the ALD deposition conditions. Platinum metal and $SrTiO_3$ (STO) have approximately the same lattice constants creating an epitaxial arrangement of the atoms which stabilizes the interface between the two phases creating the stable PtSTO catalyst, with Pt dispersed on the surfaces of the STO nanocuboids. These Pt nanoparticles are terminated by the family of {111} and {100} surfaces. The Pt nanoparticles on STO are fully exposed to polymer to be processed. The support material may further be a hybrid material comprising a high surface area support material that is amorphous (with a perovskite, such as STO, added thereto). The metal nanoparticles are arranged in an ordered fashion on the crystalline substrate, with an interparticle spacing spanning from approximately 3.5 nm to 6.5 nm, tuned based on the deposition parameters, including precursor contact time, number of metal deposition cycles, metal precursor, and temperature.

The crystalline surfaces of the support materials, for example perovskite, will provide a foundation for ordered arrays of nanoparticles, thus providing an ordered array of catalytic sites. When the particles are sufficiently small (~50 nm), large surface areas (~20m$^2$/g) can also be achieved. Large surface areas allow for high loadings of catalysts to be supported onto these surfaces modified with new structural features and functionalities. STO nanocuboids {001} or rhombic dodecahedral nanoparticles {110} are synthesized solvothermally under basic conditions giving $TiO_2$-terminated surfaces.

Surface reconstruction is another route to control the nanoparticle nucleation and polymer-surface interactions.

For example, the reconstruction of STO has been shown to be an ordered arrangement of $TiO_6$ and $TiO_5$[ ] ([ ] refers to an oxygen vacancy) octahedral and approximately square pyramidal polyhedral units, respectively. The surface reconstruction is related to the underlying bulk $SrTiO_3$ leading to crystallographically defined distances (~20 Å, 14 Å, 9.8 Å, 4.2 Å, or 3.4 Å) between under-coordinated metal centers ($Ti^{4+}$) which can be exploited as anchoring sites to precisely position catalytic centers. In addition, polymer-catalyst and polymer-support interactions will play an important role in achieving selective catalysis. In order to control these interactions, one can modify the STO surface, leaving the catalytically active sites (e.g., metal nanoparticles) unperturbed. For instance, $TiO_2$-rich 2×1 STO {001} surfaces are more polar, to minimize polymer-support interactions relative to polymer-catalyst interactions. Stable perovskites such as $LaAlO_3$ and $LnScO_3$ (Ln=La, Nd, Gd, Dy) allow access to new distances and surfaces.

As described, the catalytic material includes nanoparticles on the support material. The ordered surfaces of the crystalline support, such as perovskites, allows for the deposition of catalytic sites at crystallographically—defined positions in the form of ordered metal nanoparticles. In one embodiment, the nanoparticles comprise a catalytic metal (e.g., Pt). While amorphous silica or alumina-supported Pt, Ir, Rh, and Ru nanoparticles are known hydrogenolysis catalysts, the carbon-carbon catalytic cleavage chemistry of Pt/STO and other perovskite-supported nanoparticles was previously unknown. The ordered metal nanoparticles may be selected from the group consisting of noble metals such as ruthenium (Ru), rhodium (Rh), palladium (Pd), silver (Ag), copper (Cu), osmium (Os), rhenium (Re), iridium (Ir), platinum (Pt), and gold (Au), as well as Group 4 to Group 6 metals, (e.g., Zr, V, Cr, W, etc.). The metal is in the form of a nanoparticle. In particular, the nanoparticles have an average size of 5 nm±4 nm. The nanoparticles could be composed of a single element or of multiple elements. Deposition on crystalline support materials provide well-defined arrays of nanoparticle catalysts for the chopping of long-chain hydrocarbon through selective hydrogenolysis.

The nanoparticles may be deposited by atomic layer deposition (ALD). The ALD process may be tuned to deposit nanoparticles with a desired inter-particle space associated with the desired length of the resultant polymer chains following cleaving.

While in some embodiments nanoparticles will be deposited using ALD, the ALD of noble metals, such as Pt, has been shown to produce nanoparticles in the early stages of growth. The modification of steric parameters of the ALD precursors can change the nucleation density, giving rise to nanoparticles with different sizes and inter-particle distances. In addition, variation of the ALD deposition conditions (e.g., contact time, flow rate, number of deposition cycles, and temperature) is also employed to yield an ordered array of metal nanoparticles with controlled inter-particle distance.

In one embodiment, the process includes, and the catalyst facilitates, hydrogenolysis. Hydrocarbon polymers interact with the catalytic material primarily through multi-site (relatively weak) Van der Waals interactions. Polymer-surface interactions are sufficiently dominated by the action of the metal particles to favor the docking and cleaving. In one embodiment, targeted modification of the (oxide) support surface and metal nanoparticle can alter the relative strength of interactions between the polymer and the nanoparticles and the polymer and the support. In this example, computational modeling predictions by Heyden of linear PE hydrogenolysis catalyzed by an ordered array of supported nanoparticles suggest that the combined effect of many weak interactions between hydrocarbon chains and the catalyst array can be sufficient to appropriately position the polymer and allow for selective hydrogenolysis at relatively low temperatures. Specifically, the entropy of adsorption (~−0.002 eV/K) of a polymer chain is hardly affected once part of the chain is adsorbed. In contrast, the enthalpy of adsorption increases roughly linearly with the number of adsorption sites, such that macromolecules prefer maximizing the number of adsorption sites on the nanoparticle. Thus, given a suitable catalyst and reaction conditions, long polymer chains that are able to adsorb on multiple nanoparticles can be cleaved, while short chains that are unable to interact with multiple nanoparticles cannot be cleaved.

The hydrogenolysis cleaves a carbon-carbon bond in the polymer to create smaller fragments. Feedstock for the process may be unsorted polymer materials, such as commonly used consumer plastics, or may be sorted materials to provide a common polymer as feedstock and result in a consistent hydrocarbon fragment. The catalytic material includes both docking and chopping sites. The docking site helps the polymer to stay close (bounded) to the catalytic active sites (the chopping sites) and not diffuse in the reaction media. A docking site can be also a chopping site, such as where both are the catalytic metal nanoparticle.

In one embodiment, the size of the resultant carbon fragment is correlated with the inter-particle spacing of the catalytic metal nanoparticles. For example, the process facilitates the carbon-carbon bond cleavage of waste polymers such as low and high density polyethylene and propylene a by selective catalytic hydrogenolysis into a distribution centered ~$C_{100}$ fragments. The product distribution can be tune and fine-tuned by varying the interparticle distance. For example, 10 nm interparticle distance gives rise to a distribution centered ~$C_{100}$ fragments, whereas a 15 nm interparticle distance yield a product consisting of ~$C_{180}$ while a 5 nm interparticle distance yield a product consisting of ~$C_{60}$. For example, these products can be blended with basic oil (poly-alpha olefin (PAO)) for tribological applications. In one embodiment, the fragments are free of low boiling point alkanes, such as methane, ethane, and butane. Notably, this is the opposite behavior of the $Zr@SiO_2Al_2O_3$ catalysts (see, e.g., Basset, J. -M *Angew. Chem. Int. Ed.* 1998, 37, 806-810).

Figure 3:
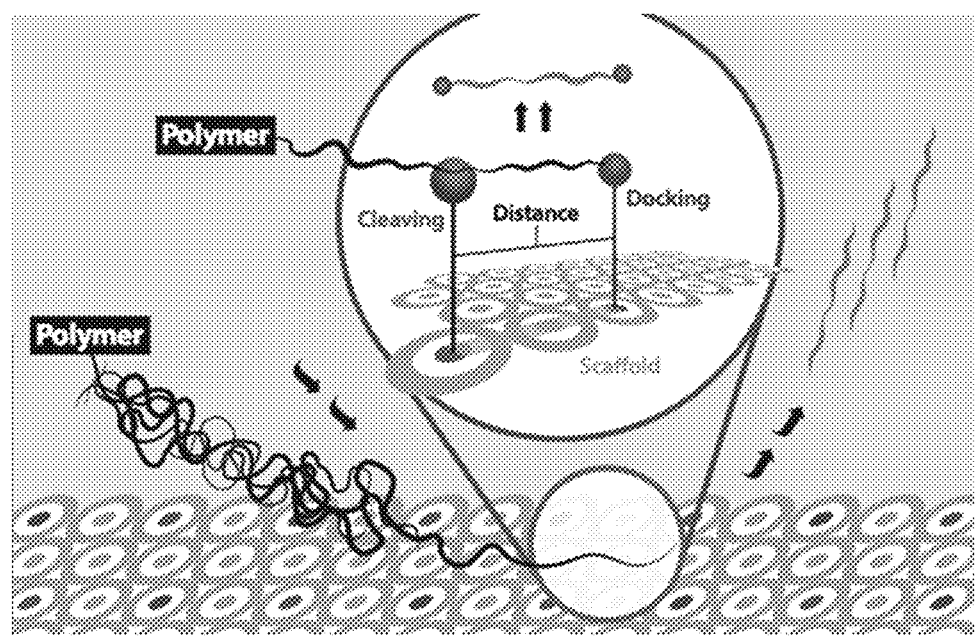
FIG. 3 is an illustration of a model depicting polymer upcycling by distance-selective bond cleavage in a heterogeneous catalyst, with the inset a magnified view showing catalytic action on a polymer by controlling the distance between docking and cleaving sites.
Figure 4A:
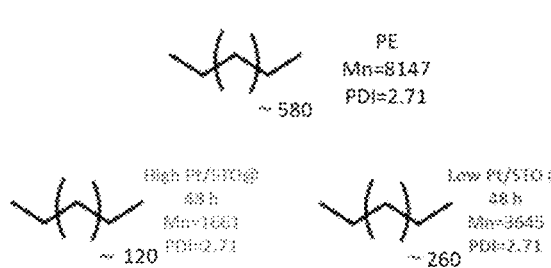
FIG. 4A shows the three tested materials, PE, a high loading Pt/STO and a low loading Pt/STO.
Figure 4B:
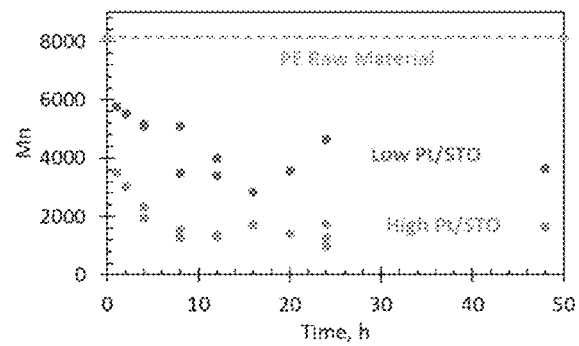
FIG. 4B shows the number average molecular weight ($M_n$) (i.e., total weight of polymer divided by the total number of molecules) over time.
Figure 4C:
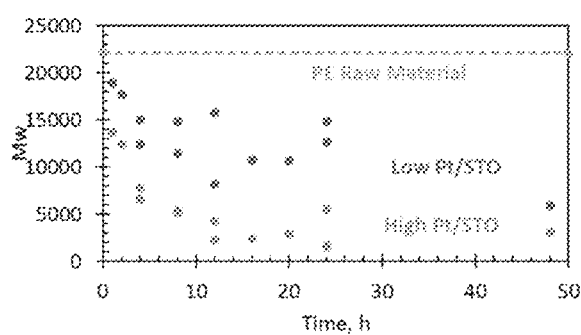
FIG. 4C shows the molecular weight ($M_w$) over time.
Figure 4D:
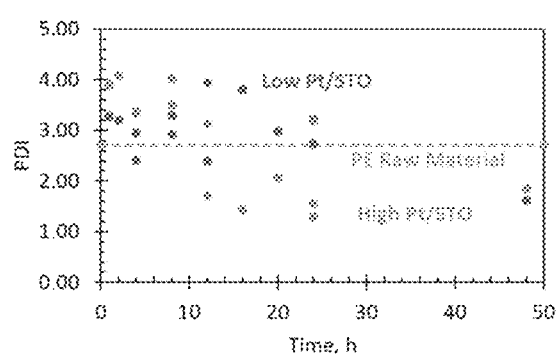
FIG. 4D shows the polydispersity index (PDI), which equals $M_w/M_n$.

The hydrogenolysis is facilitated by the catalytic material described at a temperature range of 100° C. to 500° C., for example at 300° C. for 24 h and at a pressure of 1atm to 1000 PSI. As seen in FIG. 3, $M_n$, $M_w$, and PDI are stabilized after around 10 h reaction indicating that the chopping does not go further. Hydrogenolysis of polymers using the catalyst described herein, in one embodiment, proceeds without the use of a solvent (i.e., solvent free). As used herein, "solvent-free" refers to the process being carried out with no added solvents (i.e., only the use of polymer products as a feedstock). Note, the polymer products may have incidental solvent either as residue, such as in a plastic container or as a contaminant in the polymer itself.

Because the relative rates of binding and carbon-carbon bond cleavage are key to selective chopping, controlling these rates via reaction conditions and catalyst structure is important. The rate of ethane hydrogenolysis, for example, is approximately $1/p_H$ so adjusting $H_2$ pressure will be used to alter chopping rates. Ethane cleavage rates increase with increasing temperature, and optimal conditions for selective chopping of PE will require balancing pressure and electronic and geometric surface structures to adjust the hydrogenolysis rate.

Experimental Examples

A high-$M_w$ HDPE ($M_n$~100 kDa) was disassembled through selective hydrocracking into smaller, soluble species using platinum nanoparticles supported on strontium titanate (Pt/STO) catalyst. Pt/STO functions as a catalyst for gas-phase hydrogenation of acrolein. Moreover, two sets of unpublished preliminary experiments establish the proof of principle. The first shows that Pt/STO is a selective hydrogenolysis catalyst. It was demonstrated that Pt/STO selectively converts n-hexane to propane at <300° C. under 10 atm of $H_2$ with greater than 90% selectivity. These reactions were tested with $C_6H_{14}$ and $H_2$ mixtures flowing over the Pt/STO catalyst at 1.5% conversion. Importantly, post-catalysis characterization (PXRD) suggests that the Pt/STO is stable under hydrogenolysis conditions.

Catalyst Synthesis & Design Strategy

The Pt/STO catalyst is synthesized by deposition of molecular Pt on STO nanocuboids using ALD, which produces nearly uniform 1-nm-sized platinum nanoparticles that have regular 10 nm inter-particle spacing.

Figure 2A:
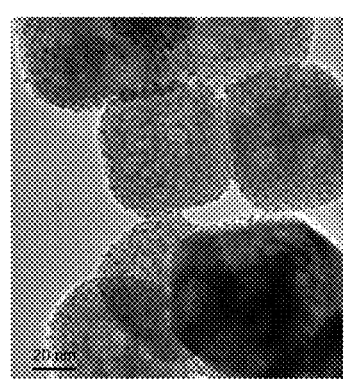
FIG. 2A is a photomicrograph of one embodiment of an ordered metal nanoparticles (platinum) supported on the surface of perovskites (strontium titanate).
Figure 2B:
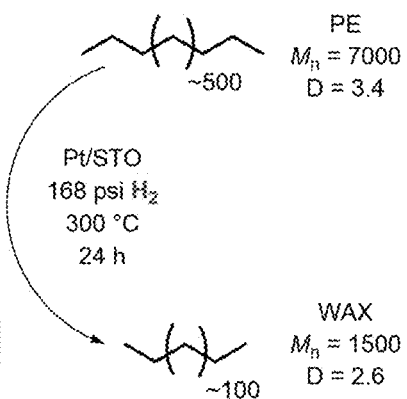
FIG. 2B illustrates hydrogenolysis of polyethylene by the material illustrated in FIG. 2A into a distribution centered $\sim C_{100}$ fragments.

For the experimental samples using STO supports, the STO support is synthesized as 60 nm edged nanocuboids and contains faces with an ordered {001} surface reconstruction. The catalyst is synthesized by deposition of molecular Pt on STO nanocuboids using ALD, which produces nearly uniform 1 nmm sized platinum nanoparticles that have regular 10 nm inter-particle spacing (FIG. 2). The ordered STO surface assists in the ALD assembly of the patterned Pt nanoparticle array, with the nanoparticle density and size determined by the super-saturation of Pt at the surface in the early stages.

Atomic Layer Deposition

ALD was performed in a viscous flow reactor. Powder samples were placed inside the ALD chamber under vacuum (base pressure=0.05 Torr) and heated to 200° C. The ALD precursor methylcyclopentadienyl)trimethylplatinum (MeCpPtMe$_3$) (Strem, 99%) was used as the platinum source with 50 sccm ultrahigh purity (UHP) $N_2$ as the carrier gas. An ozone generator (UHP $O_2$ source, 99.99%) was utilized for the ozone source. The timing sequence for Pt ALD was 300 s-300 s-300 s-300 s static dosing, where the valve to the vacuum was shut off during the dose step. The Pt bubbler was heated to 65° C. and the precursor inlet line was heated to 75° C. A pre-treatment of the powder sample was performed where the sample was held under constant ozone exposure at 200° C. for 2 hrs.

The ordered STO surface assists in the ALD assembly of the patterned Pt nanoparticle array, with the nanoparticle density and size determined by the super-saturation of Pt at the surface in the early stages.

Hydrogenolysis Reaction

Commercial linear PE ($M_n$=7.0 kD, Đ=3.4) under $H_2$ (<300 psi) with Pt/STO at 300° C. for 24 h, gives full conversion to the desired chopped product, a mono-modal, narrow distribution wax ($M_n$=1.5 kDa, Đ=2.6). The average chain length of the product is $C_{106}$, corresponding to ~12 nm in chain length, which is close to the distance between Pt nanoparticles.

The reaction of commercial linear PE ($M_n$=7.0 kD, Đ>=3.4) under $H_2$ (168 psi) in the presence of catalytic Pt/STO at 300° C. for 24 h, in the absence of solvent, gives full conversion to the desired chopped product, a mono-modal, narrow distribution wax ($M_n$=1.5 kDa, f)=2.6) (Table 1). The average chain length of the product is $C_{106}$, corresponding to ~12 nm in chain length, which is close to the distance between Pt nanoparticles. Microscopy results show the catalyst kept its integrity after the reaction, indicating the possibility of recycling the catalyst.

TABLE 1

| Catalyst | Sample | $M_{w\ (mded)}$ | $M_{n\ (mded)}$ | PDI |
|---|---|---|---|---|
| Conditions #1 (commercial PE): 10 mg catalyst, 50 mg PE (sigma), 168 psi $H_2$, 300° C., 24 h | | | | |
| — | PE | 22,600 | 7,400 | 3.1 |
| —/thermal | PE | 24,400 | 6,200 | 3.9 |
| Pt/STO (4.5 w/w % Pt) | PE | 3,500 | 1,400 | 2.4 |
| Pt/SiO$_2$ (2.5 w/w % Pt) | PE | 17,700 | 7,400 | 2.4 |
| Pt/Al$_2$O$_3$ (1 w/w % Pt) | PE | 7,400 | 2,100 | 3.5 |

A control experiment that lacked Pt/STO returns the starting material unchanged, indicating that the arrayed Pt nanoparticles on STO are responsible for the catalysis. Short alkanes products ($C_1$-$C_{50}$) were not detected, in marked contrast to the state-of-the-art ZrH@SiAlOx catalyst (Basset, J. -M Angew. Chem. Int. Ed. 1998, 37, 806-810). A commercial plastic trash bag was used (Table 2) and similar results were observed, indicating that the catalyst is not poisoned by additives and chlorine.

TABLE 2

| Catalyst | Sample | $M_{w\ (mded)}$ | $M_{n\ (mded)}$ | PDI |
|---|---|---|---|---|
| Conditions #2 (plastic bag): 10 mg catalyst, 20 mg plastic, 300 psi $H_2$, 300° C., 24 h | | | | |
| — | Plastic bag | 116,700 | 31,100 | 3.7 |
| —/thermal | Plastic bag | 10,500 | 30,400 | 3.5 |
| Pt/STO (4.5 w/w % Pt) | Plastic bag | 3,700 | 2,000 | 1.8 |
| Pt/SiO$_2$ (2.5 w/w % Pt) | Plastic bag | 118,500 | 43,300 | 2.7 |
| Pt/Al$_2$O$_3$ (1 w/w % Pt) | Plastic bag | 48,000 | 8,600 | 5.6 |

Control experiments with neither catalyst nor commercial Pt/Al$_2$O$_3$ return the polymer unchanged or with broader distribution, indicating that the arrayed Pt nanoparticles on STO are responsible for the selective catalysis.

Experiments showed that the ordered Pt/STO catalyst is effective for chopping polyethylene by hydrogenolysis into a distribution centered around $C_{100}$ fragments (FIG. 2). Specifically, the reaction of commercial linear PE ($M_n$=7.0 kD, Đ=3.4) under $H_2$ (168 psi) in the presence of catalytic Pt/STO at 300° C. for 24 h, in the absence of solvent, gives full conversion to the desired chopped product, a mono-modal, narrow distribution wax ($M_n$=1.5 kDa, Đ=2.6). The average chain length of the product is $C_{106}$, corresponding to ~12 nm in chain length, which is close to the distance between Pt nanoparticles. A control experiment that lacked Pt/STO returns the starting material unchanged, indicating that the arrayed Pt nanoparticles on STO are responsible for the catalysis. Short alkanes products ($C_1$-$C_{50}$) were not detected, in marked contrast to the ZrH@SiAlO$_x$ catalyst. This selectivity, along with the higher conversion of PE vs. $C_6$ in the two sets of experiments, reveals the beneficial effect induced by the long chain.

Importantly, the average chain length of chopped products was predicted to be approximately $C_{100}$ carbons, on the basis of the distance between the two nearest neighbor Pt nanoparticles in our initial Pt/STO catalytic material. Further, additional control experiments can be undertaken with randomly distributed Pt nanoparticles on amorphous oxides, or even on STO, to compare chopping efficiency and Mw distributions to the ordered Pt/STO. Hydrogenolysis experiments employing arrayed nanoparticles with greater interparticle separations are predicted to provide longer chains of chopped products. Short alkanes products ($C_1$-$C_{50}$) were not detected, in marked contrast to the state-of-the-art ZrH@SiAlO$_x$ catalyst (Basset, J. -M Angew. Chem. Int. Ed. 1998, 37, 806-810).

Catalyst Stability

A commercial plastic trash bag consisting of a chlorinated polymer was used, and similar results were observed, indicating that the tested catalyst is not poisoned by additives and chlorine. Further, microscopy results show the catalyst kept its integrity after the reaction, indicating the possibility of recycling the catalyst.

In addition, it is expected that bimetallic catalysts will modify electronic and geometric surface structures and act as selective hydrogenolysis catalysts, as demonstrated in many bimetallic systems, such as CuNi and RuCu, where the addition of a few percent of Cu change the hydrogenolysis activity by several orders of magnitude.

Definitions

As used herein, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

As used herein, the terms "about" and "approximately" generally mean plus or minus 10% of the stated value. For example, about 0.5 would include 0.45 and 0.55, about 10 would include 9 to 11, about 1000 would include 900 to 1100.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method of processing a polymer comprising:
   exposing the polymer to a catalyst at a temperature of 100° C. to 500° C. at a pressure of 1 atms to 68 atms;
   docking the polymer to the catalyst comprising an ordered array of nanoparticles on a crystalline substrate, with the polymer docked at a first nanoparticle within the ordered array of nanoparticles;
   cleaving at least one carbon-carbon bond of the polymer at a second nanoparticle within the ordered array of nanoparticles; and
   forming a plurality of hydrocarbon fragments from the cleaving, at least one of the hydrocarbon fragments having a carbon backbone less than an interparticle distance between the first nanoparticle and the second nanoparticle;
   wherein the polymer has a carbon backbone length greater than the interparticle distance.

2. The method of claim 1, wherein the temperature is 300° C. maintained for at least 24 hours.

3. The method of claim 1, wherein the crystalline substrate is porous.

4. The method of claim 1, wherein the crystalline substrate is a perovskite.

5. The method of claim 4, wherein the docking of the polymer to the catalyst is by Van der Waals interactions between the polymer to the catalyst.

6. The method of claim 5, wherein the polymer is polyethylene.

7. The method of claim 6, wherein the hydrocarbon fragments have a distribution centered around $C_{100}$.

\* \* \* \* \*